United States Patent [19]
Durum

[11] Patent Number: 5,328,412
[45] Date of Patent: Jul. 12, 1994

[54] APPARATUS AND METHOD FOR GENERATING A VARIABLE PULLEY SHEAVE PROFILE

[75] Inventor: Metin M. Durum, Elmhurst, Ill.

[73] Assignee: Borg-Warner Automotive, Inc., Sterling Heights, Mich.

[21] Appl. No.: 964,422

[22] Filed: Oct. 21, 1992

[51] Int. Cl.⁵ .............................................. F16H 55/56
[52] U.S. Cl. ........................................ 474/8; 474/242; 474/245
[58] Field of Search ...................... 474/8, 18, 242, 245

[56]         References Cited
         U.S. PATENT DOCUMENTS

| | | | |
|---|---|---|---|
| 803,811 | 11/1905 | Cutter . | |
| 2,897,682 | 8/1959 | Johnson | 74/230.17 |
| 3,016,755 | 1/1962 | Dittrich | 74/230.17 |
| 3,640,145 | 2/1972 | Kraus | 74/248 |
| 4,504,248 | 3/1985 | Hollinger | 474/24 |
| 4,589,859 | 5/1986 | Kanesaka | 474/148 |
| 4,631,042 | 12/1986 | Rattunde | 474/8 |
| 4,795,406 | 1/1989 | Dittrich et al. | 474/8 |

FOREIGN PATENT DOCUMENTS 915092  1/1963  United Kingdom ................... 474/8

Primary Examiner—Douglas D. Watts
Attorney, Agent, or Firm—Willian Brinks Olds

[57] ABSTRACT

An apparatus and a method for generating same provides a pulley sheave inner face profile for a variable pulley of a continuously variable transmission allowing the crowned face chain-belt centerline to remain in a plane substantially perpendicular to the axis of the pulleys at all times and at all drive ratios. Given a primary pulley sheave inner face profile, a corresponding secondary pulley sheave inner face profile can be developed to achieve substantially perfect belt alignment. The pulley sheave inner face profiles may be designed to be identical or congruent. Congruent pulley sheave inner face profiles can be developed according to an algebraic solution allowing numerically controlled design and manufacturing techniques in the fabrication of the sheave inner faces.

9 Claims, 5 Drawing Sheets

APPARATUS AND METHOD FOR GENERATING A VARIABLE PULLEY SHEAVE PROFILE

BACKGROUND OF THE INVENTION

1. Field of the Invention

The present invention relates to profiles of pulley sheaves for the variable pulleys of a continuously variable transmission. More specifically, this invention relates to a variable pulley sheave profile and a method for generating the same providing a substantially error-free alignment at all drive ratios.

2. Description of the Prior Art

In recent years, significant research and development has been devoted to a practical continuously variable transmission (CVT) for automotive applications. A CVT provides a portion of the mechanical link between the vehicle engine and the drive wheels used to control the torque output of the engine.

A CVT generally operates by the use of multiple variable pulleys mounted on parallel axes, connected by an endless chain-belt of metal or elastomeric material. A first variable pulley is situated on an input shaft and is mechanically driven by the vehicle engine. A second variable pulley is mounted on an output shaft and is driven by the first pulley through the chain-belt. The second pulley acts through additional drive components to transmit torque to the vehicle drive wheels. Each pulley rotates about an independent shaft and is formed by the cooperation of two pulley sheaves, one of which is axially movable in a direction opposite from the other. The sheave pairs, mounted on the pulley axis, form the inner faces of the pulley. The profiles of the inner faces are generally inclined, such that the two sheave inner faces tend to converge toward the pulley axis. When at least one of the sheaves is movable axially relative to the other sheave, variation in the distance separating the opposing inner faces can be obtained.

The chain-belt which mechanically links the pulleys is generally a conventional chain-belt having a plurality of interconnected chain blocks, and may have a variety of link and block configurations, e.g. pin or rocker chains, link belts, etc. . . . The contact surface of the chain blocks engages the inner faces of the pulley sheaves and transmits torque by friction. Most conventional chain block configurations include chain blocks having contact surfaces which is a plane surface or very lightly crowned contact surfaces. In such configurations, the contacts with conventional conical sheaves are line contacts (i.e., where the contacted area is a band) and not point contacts. As the chain belt passes over the pulley, the point where the chain block or link articulates is defined as the pitch-line. The pitch (p) is the distance between successive articulations.

During the operation of the CVT, a movable sheave on the first pulley may be translated axially along the pulley axis so as to increase or decrease the distance separating the sheave inner faces. Similarly, a movable sheave on the second pulley decreases or increases the distance separating the sheave inner faces. Accordingly, as the distance separating the primary pulley inner faces is increased, the distance separating the secondary pulley inner faces is caused to be decreased in order to provide mechanical and hydraulic balance.

As the sheave members are translated along the axis of the pulley, the effective pulley radius is increased or decreased due to the inclined inner face of the sheave. The location of the chain-belt articulation or neutral axis (i.e., the pitch-line) around the intermediate circumference of the pulley inner faces defines the effective radius of the pulley. As the sheave inner face separation distance of the first pulley decreases, the chain-belt is forced to adopt its contact at a larger radial distance as it rises up along the inclined sheave inner face and the pitch-line is changed. Simultaneously, the effective radius of the second pulley is proportionately decreased by the separation of the pulley sheaves therein. Similar to the first pulley, the chain-belt is forced to adopt its contact at a smaller radial distance and the pitch-line is changed. Thus, the ratio of the pulley radii may be varied continuously to obtain the desired final drive ratio for the specific vehicle operating conditions.

In existing pulley sheaves, the inclined inner sheave faces are generally linear (conical). However, curved profile inner sheave faces are desirable to reduce the overall profile of the CVT pulleys. For CVT pulleys, the chain-belt centerlines on the drive and driven pulley translate along the axis of the pulleys from an initial centerline position. The difference between these translations causes an offset, while the chain-belt portion in each pulley remains in a plane perpendicular to the axes of the pulleys. Consequently, the chain-belt centerlines at the span between the pulleys tilt, or become inclined, relative to the centerline planes of the pulleys. This tilt or chain-belt misalignment, can cause uneven load distribution on the chain-belt, with associated wear and fatigue effects, and contribute to undesirable noise generation.

SUMMARY OF THE INVENTION

A pulley sheave inner face profile is provided that causes the crowned face chain-belt centerline to remain in a plane substantially perpendicular to the axis of the pulleys at all times and at all drive ratios. Given a drive pulley sheave inner face profile, a corresponding driven pulley sheave inner face profile is developed which achieves substantially error-free belt alignment by insuring that the rate of change of the effective radius of the driving and driven pulleys sheave inner face profiles may be designed to be identical or congruent. For congruent pulley sheave inner face profiles, an algebraic solution is available to allow numerically controlled design and manufacturing techniques in the fabrication of the sheave inner faces.

These and other related features of the present invention will be apparent from a reading of the following description of the drawings and the appended claims.

DETAILED DESCRIPTION OF THE DRAWINGS

Figure 1:
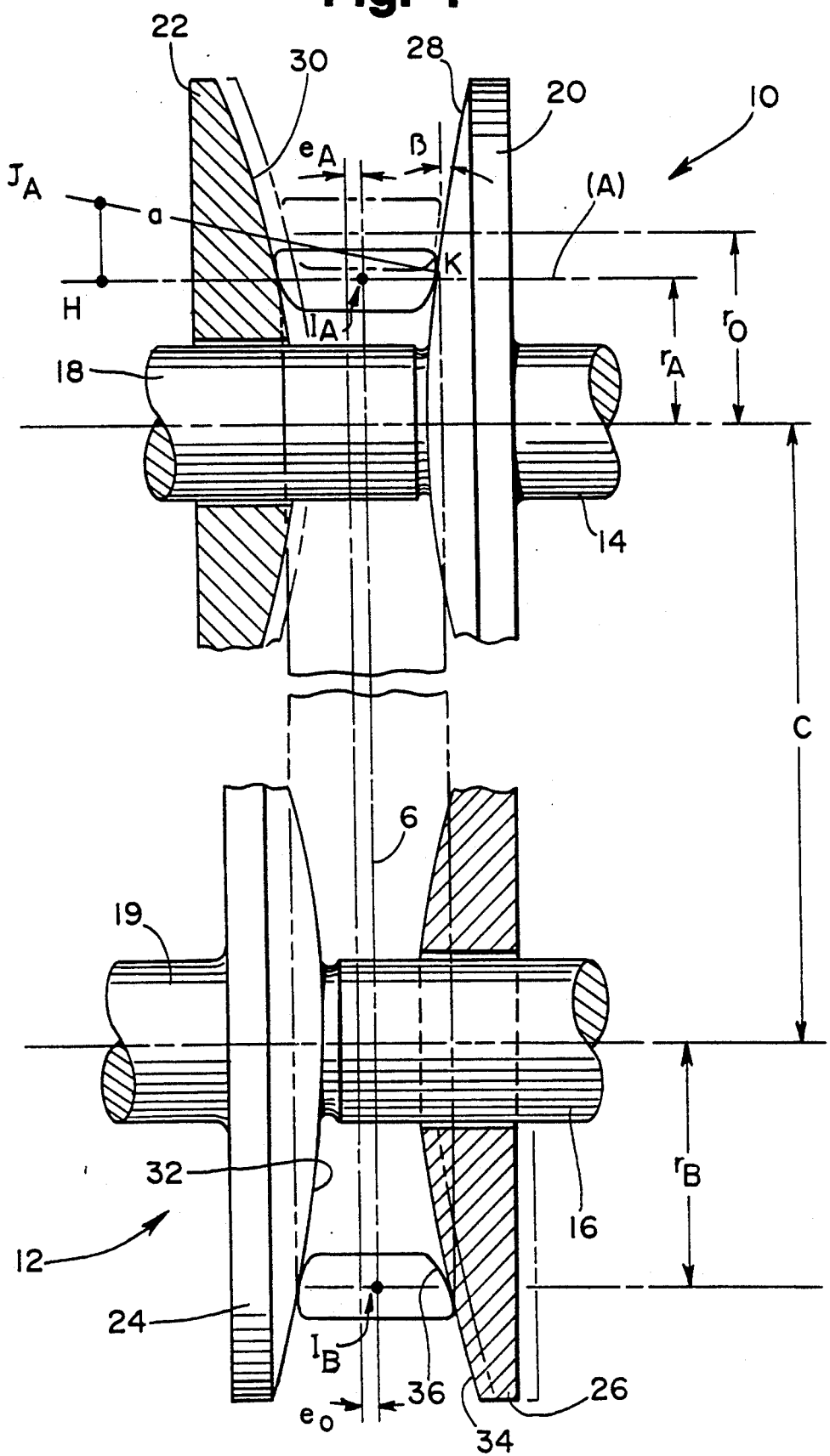
FIG. 1 is a cross-sectional view of the variable pulleys, showing the relationship of the chain-belt to the pulley sheave inner face profile.

Referring to the drawings, wherein reference characters designate like or corresponding parts throughout the views, FIG. 1 depicts the overall CVT drive mechanism seen in cross-sectional view. Chain-belt 6 is commonly engaged by a first pulley 10 and a cooperating second pulley 12. The first pulley 10 is further comprised of two cooperating pulley sheaves 20 and 22. The pulley sheave 22 is arranged about input shaft 18 such that the pulley sheave 22 is free to translate along the axis of shaft 18 relative to the pulley sheave 20, thus increasing or decreasing the distance separating the pulley sheaves 20 and 22. The second pulley 12 is also comprised of two cooperating pulley sheaves 24 and 26. The pulley sheave 26 is arranged about the axis of output shaft 19 such that the pulley sheave 26 is free to translate along the axis of shaft 19 relative to the pulley sheave 24 to decrease or increase the separation of the pulley sheaves 24 and 26.

As the pulley sheave 22 is caused to move to the right in FIG. 1 along the axis of shaft 18; the distance separating the inner face 28 of the pulley sheave 20 and inner face 30 of the pulley sheave 22 is decreased. As a result, load block 8 is radially displaced, i.e. the point or line of contact K of the rounded crown face 36 of the load block 8 of the chain-belt 6 interacting with the sheave inner faces 28 and 30 is moved upward along the inner face profile of sheave inner faces 28 and 30. Since the pitch-line of the load blocks around the intermediate circumference of the pulley sheave inner faces 28 and 30 define the effective radius of the pulley 10, the effective radius $r_A$ of the first pulley 10 will be increased.

As the length of the chain-belt 6 is fixed, a decrease in the effective radius $r_B$ of the second pulley 12 is necessary. This is accomplished by causing the pulley sheave 26 to also move to the right in FIG. 1 along the axis 19. As the distance separating the inner face 32 of the pulley sheave 24 and the inner face 34 of the pulley sheave 26 is increased, load block 8 is again radially displaced and the point or line of contact K of the rounded crown face 36 of the load block 8 is moved toward the axis 19 along the inner faces profile of sheave inner faces 32 and 34. Since the pitch-line of the load blocks define the effective radius of the pulley 12, the effective radius $r_B$ of the second pulley 12 will be decreased. Accordingly, as the effective radii $r_A$ and $r_B$ are increased and decreased, respectively, along the fixed length l of chain-belt 6, the drive ratio $r_A/r_B$ is varied.

Figure 2:
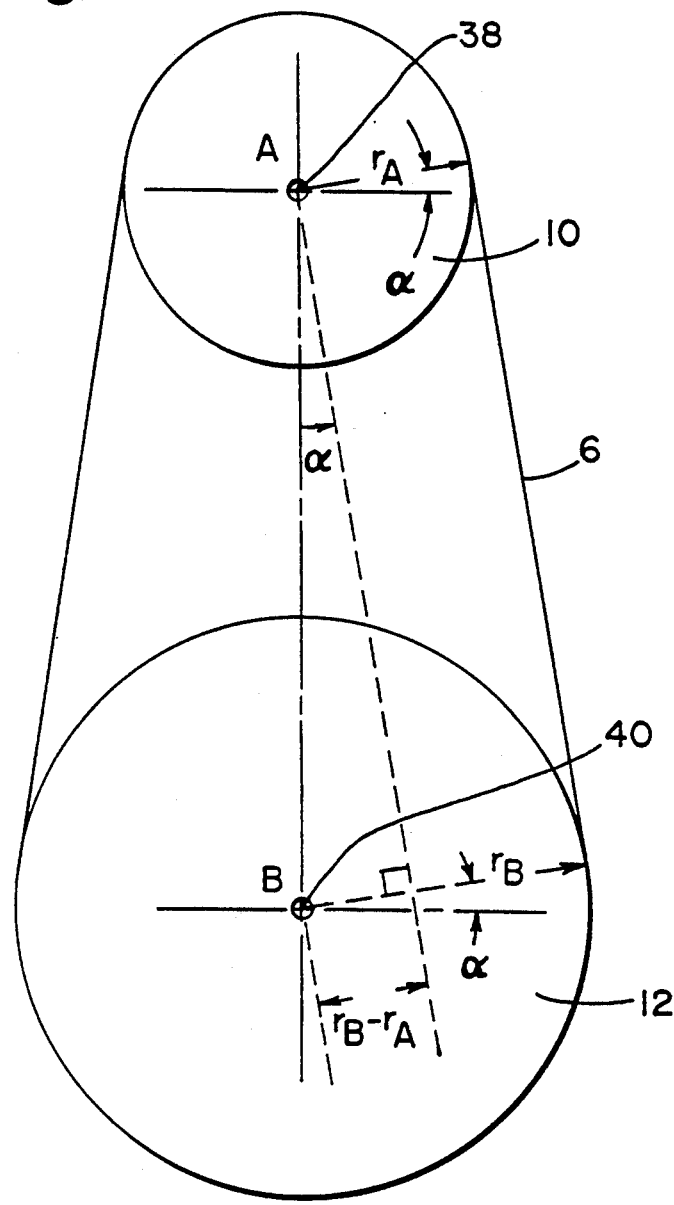
FIG. 2 is a diagrammatic view of the variable pulleys perpendicular to the axis of the pulleys.

The influence of the change in the effective radii $r_A$ and $r_B$ can be seen in FIG. 2, which illustrates the relative orientation of the pulleys 10 and 12. The first pulley 10 is shown concentrically located on its axis 38, while the second pulley 12 is shown concentrically located in its axis 40. The distance c separating axes 38 and 40 is preferably fixed.

As the ratio $r_A/r_B$ is varied, the angle $\alpha$ defines the slope of the chain-belt free strands relative to the plane of axis. At $r_A/r_B=1$, angle $\alpha$ equals zero. At $r_A/r_B<1$, angle $\alpha$ is positive, as shown in FIG. 2, while when $r_A/r_B>1$, angle $\alpha$ is negative. Further, when $r_A/r_B=1$, $r_A=r_B=r_0$.

For purposes of analysis and referring to FIG. 1, $e_A$ defines the axial shift or axial displacement of the centerline of the chain-belt 6 and load block 8 resulting from the radial displacement of load block 8 when the effective radius of the first pulley is changed. The axial displacement $e_A$ is defined as the centerline position relative to the original centerline position at $r_A/r_B=1$. Similarly, $e_B$ defines the axial shift or axial displacement in the centerline of the chain-belt 6 and load block 8 engaging second pulley 12 from the original centerline position. The offset or misalignment e causing bending of the chain-belt 8, which is addressed by this invention, can thus be defined by $e = e_B - e_A$. The chain-belt has perfect alignment when $e=0$, which occurs when the first pulley 10 has an effective radius of $r_{A0}$ and the second pulley 12 has an effective radius of $r_{B0}$. When e is zero, misalignment is eliminated and the centerline of chain-belt 8 must remain parallel to the plane of the pulleys 10 and 12 at all points along its length.

The geometry of the system depicted in FIGS. 1 and 2 can be further analyzed in terms of span c, chain-belt length l, angle $\alpha$, $r_A$ and $r_B$ by the following equations:

$$r_B - r_A = c \sin \alpha \quad \quad 1.$$
$$l = (\pi + 2\alpha)r_B + (\pi - 2\alpha)r_A + 2c \cos \alpha \quad \quad 2.$$
$$l = \pi(r_B + r_A) + 2\alpha(r_B - r_A) + 2c \cos \alpha$$
$$l = \pi(r_B + r_A) + 2c\alpha \sin\alpha + 2c \cos \alpha$$
$$r_B + r_A = l/\pi - (2c/\pi) \alpha \sin\alpha - (2c/\pi) \cos \alpha \quad \quad 3.$$
$$r_A = l/2\pi - c(\alpha/\pi + \tfrac{1}{2}) \sin \alpha - c/\pi \cos \alpha \quad \quad 4.$$
$$r_B = l/2\pi - c(\alpha/\pi + \tfrac{1}{2}) \sin \alpha - c/\pi \cos \alpha$$
$$r_B = r_A = r_0 = (l - 2c)/2\pi, \text{ when } \alpha = 0 \quad \quad 5.$$

Figure 1A:
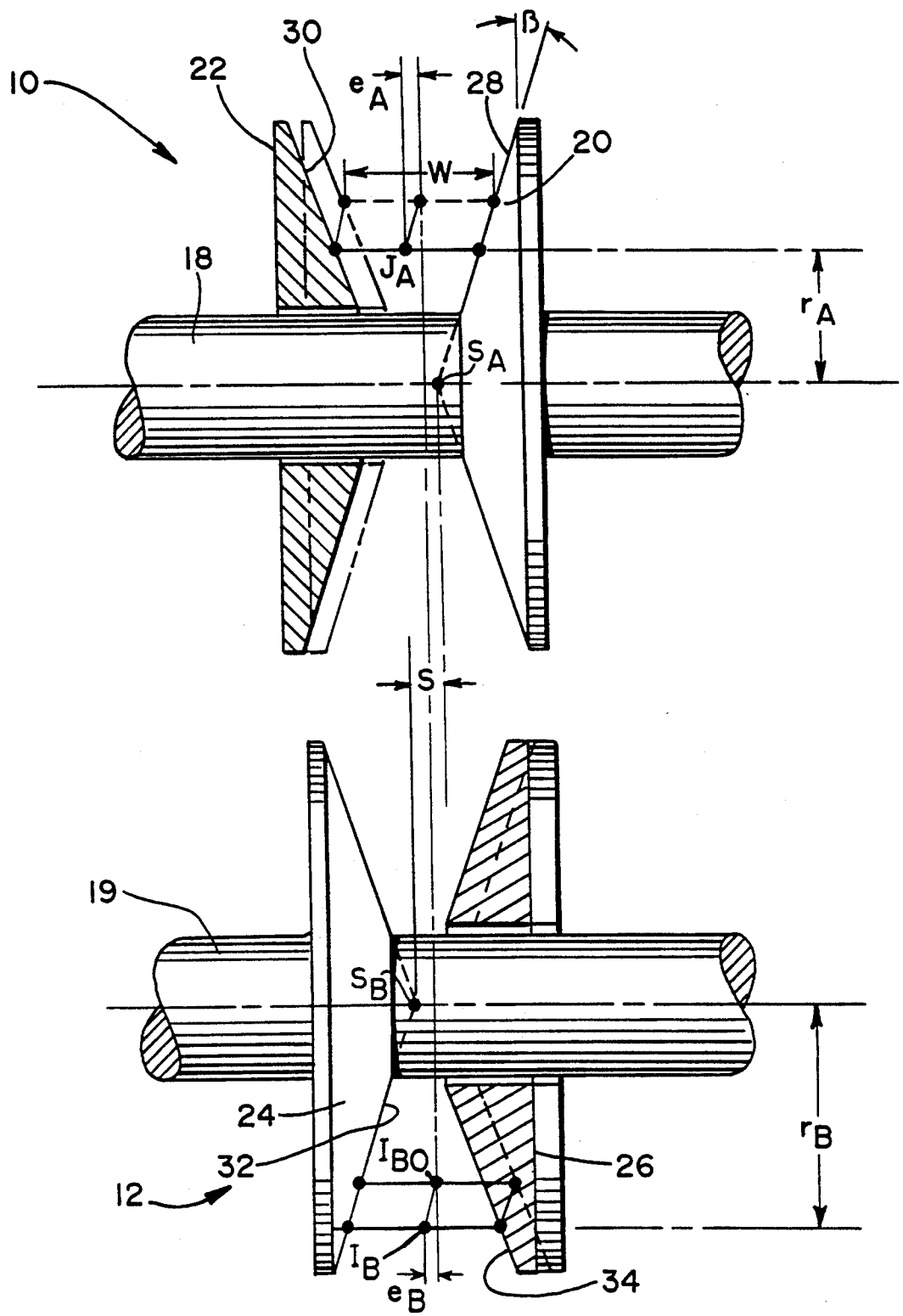
FIG. 1A is a cross-sectional view of a variable pulley having conical sheaves.
Figure 3:
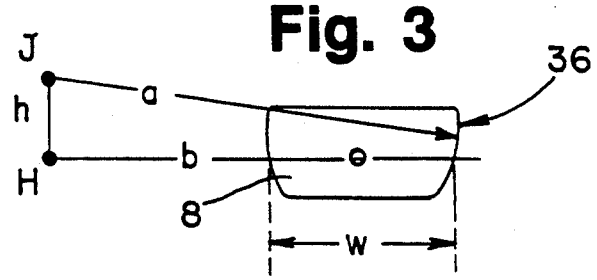
FIG. 3 is a geometrical definition of a load block which illustrates various dimensional variables that the sheave interface profile depends upon.

In addition, when conventional conical sheaves (i.e. where $\beta$ is constant) are utilized, as illustrated in FIG. 1A, the geometry of the system can be further analyzed by the following equation:

$$e = e_B - e_A = w - s - (r_A + r_B) \tan \beta \quad \quad 6.$$

where (w) is the width of the block at its pitch line as illustrated in FIG. 3, and (s) is the axial distance between the hypothetical apex $S_A$ of fixed sheave 20 and the hypothetical apex $S_B$ of fixed sheave 24 as illustrated in FIG. 1A.

Utilizing these geometric relationships, it is possible for a given first pulley sheave inner face 28 profile, to determine a second pulley sheave inner face 32 that generates substantially zero belt misalignment ($e = e_B - e_A = 0$) at all values of $r_A/r_B$. In addition to the variables noted above, the sheave inner face 32 profile is dependent on the load block 8 dimensional variables of (a), (b), and (h), as shown in FIG. 3. The resulting first and second sheave profiles, where zero misalignment is possible, are considered conjugate pairs.

Figure 4:
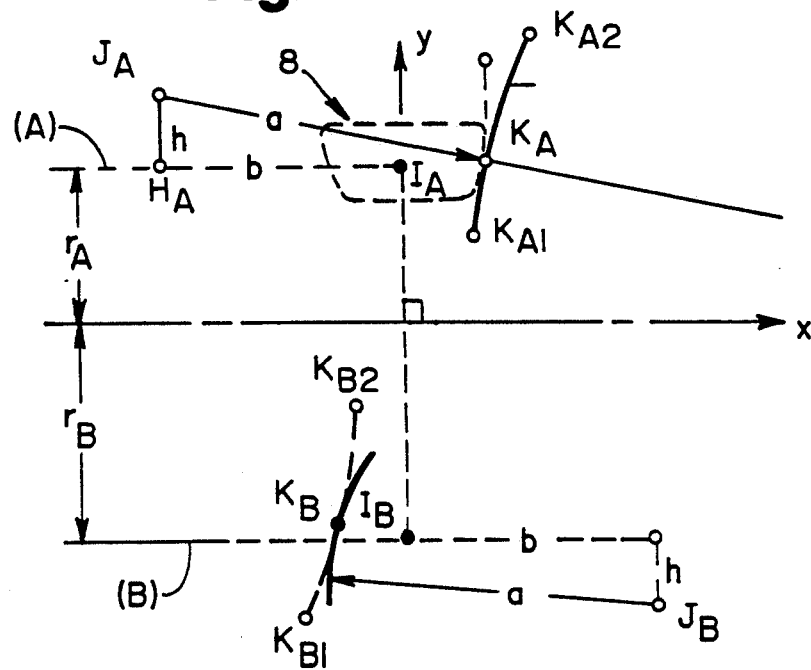
FIG. 4 is a diagram illustrating the method of determining a conjugate pulley inner face profile in accordance with one embodiment of the present invention.

A method of graphical construction of the conjugate pairs is shown in FIG. 4. The profile of the inner face 28 of drive sheave 20 is shown as arc $K_{A1}K_{A2}$, which represents the locus of all contact points K of the load block 8 with the inner sheave face 28 as the radius $r_A$ is varied. Positioned on the same axis 18, for simplicity of presentation, is the conjugate inner face 32 of sheave 24. The method of graphical construction is as follows:

A. Draw the given profile arc $K_{A1}K_{A2}$ and divide the arc into (n) discrete contact points K along its path.

B. From a selected contact point $K_A$ along the arc path, draw the normal to the tangent of arc $K_{A1}K_{A2}$ at point $K_A$.

C. Locate the center of the crown forming the contact surface of load block 8 along the established normal and indicating the crown radius of this circle as $K_AJ_A=(a)$.

D. Locate the point ($H_A$) measuring $H_AJ_A=h$ in y direction. Draw the pitch-line (A) from point $H_A$ as a parallel line to x axis. Measure the pitch radius $r_A$ which is the effective radius of the variable pulley 10.

E. Locate the midpoint $I_A$ of the block along the pitch-line, measuring $HA_AI_A=b$ in the x direction.

F. Calculate angle $\alpha$ from Eq. 4 above for given span c, chain belt length l, and the measured radius $r_A$ (by iteration or any other well known methods).

G. Calculate $r_B$ from Eq. 4 above and draw the corresponding pitch-line (B).

H. Locate the midpoint $I_B$ of load block 8 on pitch-line (B) by projecting $I_A$ perpendicularly onto pitch-line (B).

I. Locate the center $J_B$ of the circle defining the arc of the crown forming the contact surface of contact block 8 along the arc $K_{B1}K_{B2}$ by constructing duplicates of (b) and (h) as shown.

J. Draw the crown arc of the contact surface of load block 8 established by center $J_B$ with radius$=(a)$.

K. Repeat this procedure for the remaining points (n) located along the arc $K_{A1}K_{A2}$ to form a series of crown arcs established by centers $J_B$.

Thus, the envelope of the series of crown arcs will define the conjugate inner face 32 of the driven sheave 26.

Figure 4A:
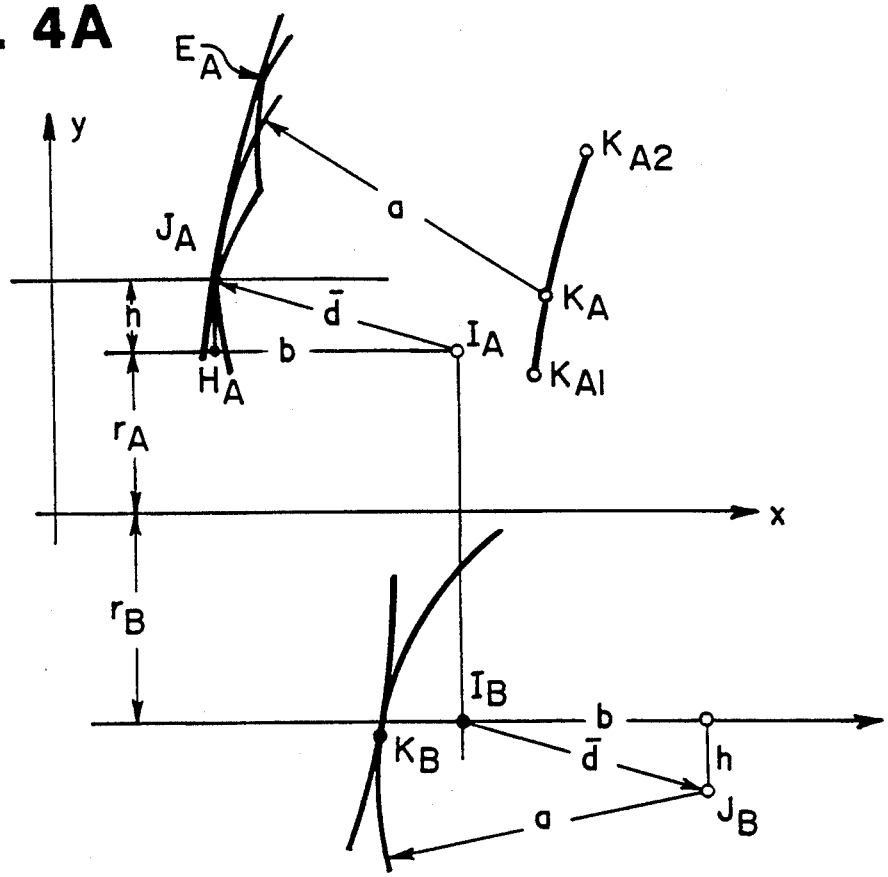
FIG. 4a is a diagram illustrating the method of determining a conjugate pulley inner face profile in accordance with an alternative embodiment of the present invention.

An alternate method of graphical construction of the conjugate pairs is illustrated in FIG. 4a. In accordance with this method, graphical construction of the conjugate pairs is achieved by the following steps:

1) Draw the given sheave profile $K_{A1}K_{A2}$ with (n) discrete contact points as ($K_A$).
2) For each of the (n) discrete contact points ($K_A$), draw circular arcs of radius (a) with centers ($K_A$) and trace their envelope ($E_A$).
3) Calculate the pitch radii ($r_A$) and ($r_B$) incrementing the strand angle ($\alpha$) starting from $\alpha=0$, using equation (4).
4) Draw a parallel line to x axis at $y=r_A+h$ and find its intersection ($J_A$) with the envelope ($E_A$).
5) Find the block midpoint ($I_A$) translating ($J_A$) by vector $\bar{d}$ whose components are $(b,-h)$.
6) Draw a parallel line to x axis from $y=-r_B$ and find the projection ($I_B$) of point ($I_A$) on this line.
7) Find the point ($J_B$) translating the point ($I_B$) by vector $\bar{d}$.
8) Draw a circular arc of radius (a) with center ($J_B$).
9) Repeat this procedure with increments ($\Delta\alpha$) and ($-\Delta\alpha$) until the profile ends ($K_{A1}$) and ($K_{A2}$) or $(r_A)^{min}$ and $(r_A)^{max}$ are reached.
10) The envelope of these circular arcs is the conjugate profile.

This alternate method avoids drawing normals to a given profile and further avoids iterative solution of ($\alpha$) for a given ($r_A$).

Figure 5:
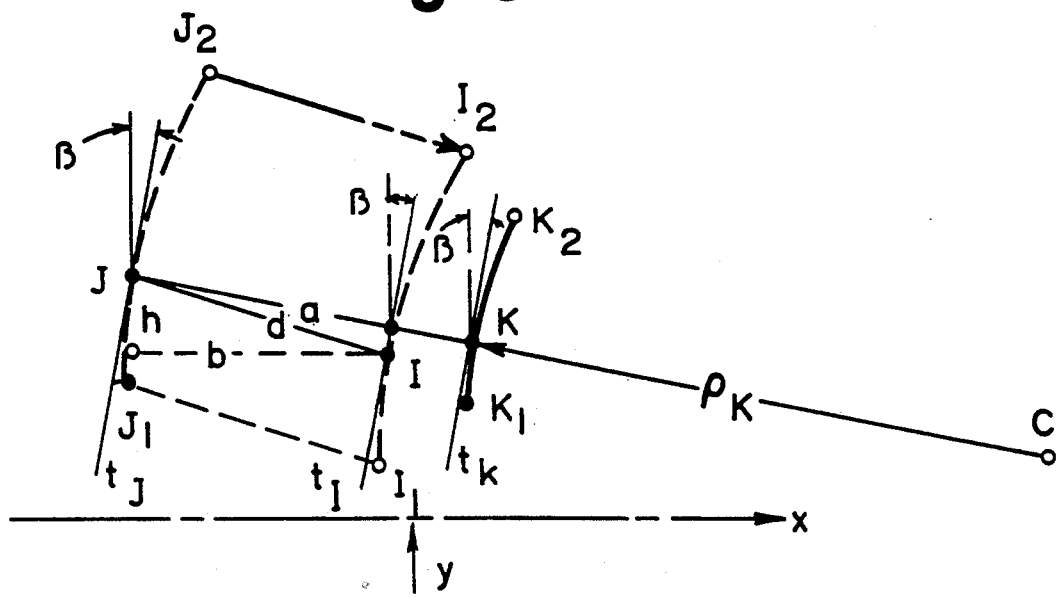
FIG. 5 is a graphical representation of the relationship between the chain-belt load block and the pulley sheave inner face profile over the range of drive ratios of the pulleys.

Referring to FIG. 5 several useful geometric relationships can be identified. First, the locus of all J creates the flank of an envelope of circles whose radius is (a) and whose center follows the contours of the inner face 28 of pulley sheave 20. Second, the radius of curvature $\rho J$, of the locus of all J and the radius of curvature, $\rho K$, of the locus of all K are related by:

$$\rho J = \rho K + (a). \qquad 7.$$

Third, the locus of all I is the translation of the locus of all J with a constant displacement vector $\bar{d}$ whose components are (b) and (h). Accordingly, the locus of all I and the locus of all J are congruent and parallel at all corresponding points. Fourth, the tangents to the locus of all K, the locus of all J and the locus of all I at corresponding points are parallel, resulting in:

$$dy_K/dx = dy_J/dx = dy_I/dx \qquad 7'.$$

These relationships are especially useful in obtaining a digital solution of the conjugate profiles.

Figure 6:
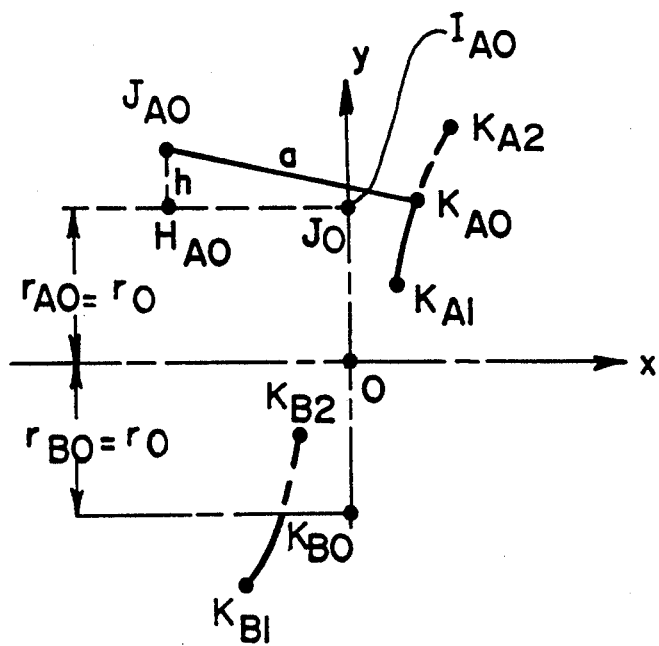
FIG. 6 is a diagram illustrating the method of determining a conjugate and congruent pulley inner face profile in accordance with the present invention.

Although the inner faces 28 and 32 are conjugate, they are not necessarily congruent. To assure that the inner faces 28 and 32 are congruent, or "twin", the method of graphical construction is as follows, with reference made to FIG. 6:

A. Draw the x and y axes and calculate $r_0=(1-2c)2\pi$ according to Eq. 5 above.

B. Locate the load block 8 midpoint $I_{A0}$ with $x_{A0}=0$ and $Y_{A0}=r_0$.

C. Locate $H_{A0}$ and $J_{A0}$ using the dimensions for (b) and (h) determined above.

D. From the center $J_{A0}$, draw the load block 8 crown circle with radius (a).

E. Choose a profile portion $K_{A1}K_{A0}$ at a tangent to the load block 8 crown circle at $K_{A0}$.

F. Construct the conjugate $K_{B0}K_{B1}$ of the chosen profile $K_{A1}K_{A0}$ (see method above).

G. Superimpose $K_{B0}K_{B1}$ as $K_{A0}K_{A2}$ above the top of chosen profile $K_{A1}K_{A0}$ by rotating it 180 degrees about the origin 0 in the x-y plane.

Thus, the curves $K_{A1}K_{A0}K_{A2}$ and $K_{B1}K_{B0}K_{B2}$ create compound "twin" sheave profiles.

Analytically, the "twin" inner face profiles for sheave inner faces 28 and 32 can be expressed as a single algebraic curve. In an x-y coordinate system, the x axis represents the parallel axis shafts 38 and 40, graphically represented as shafts 18, 19 while the y axis represents the vertical position of the midpoint of the load block 8 at $r_A/r_B=1$. Thus, the coordinates of the midpoints $I_A$ and $I_B$, as seen in FIG. 1, become:

$$x_{IA} = -e_A; y_{IA} = r_A$$
$$x_{IB} = -e_B; y_{IB} = -r_B$$

If the inner face 32 is rotated 180 degrees about the origin of the x-y plane, it will coincide with the inner face 28. The coordinates of the midpoints $I_A$ and $I_B$ then become:

$$x_{IA} = -e_A; y_{IA} = r_A \qquad 8.$$
$$x_{IB} = e_B; y_{IB} = r_B$$

Knowing that when $\alpha$ changes sign (moves into the second quadrant from the first quadrant), $r_A$ becomes $r_B$ in Eq. 4 above. For "twin" inner faces, $e_B=e_A$ and the relationship of Eq. 8 provides the parametric equations of the midpoint I of load block 8:

$$x_I = \gamma_1\alpha + \gamma_3\alpha^3 + \gamma_5\alpha^5 + \ldots \qquad 9.$$
$$y_I = l/2\pi - c(\alpha/\pi + \tfrac{1}{2})\sin\alpha - c/\pi \cos\alpha$$

The coefficients of the odd power terms for the variable $\gamma_I$ are selectable based on the configuration of the inner face 28.

The derivatives of these equations yield the following:

$$dx_I/d\alpha = \gamma_1 + 3\gamma_3\alpha^2 + 5\gamma_5\alpha^4 + \ldots \quad 10.$$
$$dy_I/d\alpha = -c(\alpha/\pi + \tfrac{1}{2})\cos\alpha$$
$$d^2x_I/d\alpha^2 = 6\gamma_3\alpha + 20\gamma_5\alpha^3 + \ldots \quad 11.$$
$$d^2y_I/d\alpha^2 = c(\alpha\pi + \tfrac{1}{2})\sin\alpha - c/\pi\cos\alpha$$
$$dy_I/dx_I = (dy/d\alpha)/(dx/d\alpha) = 1/\tan\beta_I \quad 12.$$

$$d^2y_I/dx_I^2 = \frac{(dx_1/d\alpha)(d^2y_I/d\alpha^2) - (dy_I/d\alpha)(d^2x_I/d\alpha^2)}{(dx_I/d\alpha)^3}$$

$$dS_I/d\alpha = -((dx_I/d\alpha)^2 + (dy_I/d\alpha)^2)^{\frac{1}{2}}$$

where:
$S_I$ = length of arc of $I$ curve
$\tan\beta_I$ = slope of load block 8 contact point $K$ tangent to $y$ axis
$\rho_I$ = radius of curvature of locus of $I$ $$1/\rho_I = \frac{d^2y_I/dx_I^2}{(1 + (dy_I/dx_I)^2)^{3/2}} \quad 14.$$

$$x = x_I + (b) + (a)\cos\beta \quad 15.$$
$$y = y_I + (h) - (a)\sin\beta$$

where:
$(a)\cos\beta$ and $(a)\sin\beta$ are the components of vector $JK = a$.

To determine the slope of the y axis ($\tan\beta_0$) at $\alpha=0$;

$$dy/dx = dy_I/dx_I = \tan\beta_0 = -2\gamma_1/c \quad 30$$
(from Eq. 7' and 12)
$$\gamma_1 = -c/2\tan\beta_o \quad 16.$$

Thus, the slope of the inner faces 28 and 32 determines the value of $\gamma_1$. The remaining coefficients $\gamma_I$ control the overall shape of the profile. Note that $\beta=\beta_K=\beta_J=\beta_I$, $\cos\beta=(dy_I/d\alpha)/(dS_I/d\alpha)$, and $\sin\beta=(dx_I/d\alpha)/dS_I/d\alpha)$. Finally, the signs of the radii of curvatures $\rho$ for the locus of all K, J, and I are defined as positive for convex inner faces 28 and 32, while negative for concave inner faces of 28 and 32.

A preferred embodiment of the present invention has been described, however, it is not intended to limit its spirit and scope. It will be understood that various changes in the details, arrangements and configuration of the parts which have been described and illustrated above in order to explain the nature of the present inventions may be made by those skilled in the art within the principle and scope of the present invention as expressed in the appended claims.

What is claimed is:

1. A method of constructing sheaves for a continuously variable pulley transmission comprising:
   a. providing a variable first pulley operatively disposed on a first shaft;
   b. providing a variable second pulley operatively disposed on a second shaft parallel to the first shaft;
   c. providing a chain belt to interconnect the first and second variable pulleys and to define a center line of the chain, the chain belt has a plurality of crown faced contact blocks that are flexibly interconnected to define articulation points therebetween, the articulation points along the first and second pulleys define pitch-lines, the first pulley has an effective radius defined by the radial distance between the axis of the first shaft and the articulation points along the first pulley, and the second pulley has an effective radius defined by the radial distance between the axis of the second shaft and the articulation points along the second pulley; and
   d. providing a drive ratio control means to control the effective radii of the first and second pulleys, wherein each of the first and second variable pulleys have sheaves that include an inner face profile curve constructed according to the following steps:
      i. providing a first arc defining an inner face profile of the first variable pulley,
      ii. determining the relationship between the axial displacement and the radial displacement of one of the contact blocks corresponding to movement of the contact block resulting from a change in the effective radius of the first variable pulley,
      iii. determining the locus of points through which a contact point of the contact block moves as the effective radius of the first pulley is changed and the contact block changes in the radial position and follows the first inner face,
      iv. superimposing the determined axial displacement for the locus of points to provide a second locus of points, and
      v. providing a series of second arcs with each defined by one of the second locus of points, and providing an envelope of the series of arcs thereby defining a second inner face profile of the second variable pulley so that the center line of the chain remains substantially perpendicular to the axis of the first and second shafts when the pulleys are varied.

2. A method of constructing sheaves for a continuously variable pulley transmission comprising:
   a. providing a first variable pulley operatively disposed on a first shaft;
   b. providing a second variable pulley operatively disposed on a second shaft parallel to the first shaft;
   c. providing a drive ratio control means; and,
   d. providing a chain belt to interconnect the first and second variable pulleys, the chain belt has a plurality of crown faced contact blocks that are flexibly interconnected to define articulation points therebetween, the chain belt has a first pitch-line established by one of the articulation points extending along the first pulley, a second pitch-line established by one of the articulation points extending along the second pulley, and a centerline perpendicular to the axis of the first and second shafts.
   wherein each of the first and second variable pulleys have sheaves, the first sheave has a first inner sheave face and the second sheave has a second inner sheave face that is conjugate to the first inner sheave face,
   the first pulley sheave inner face has a predetermined profile and the profile of the second inner face is determined and constructed according to the following steps:
      i. drawing the given first arc defining the first inner face profile of the first variable pulley and dividing the first arc into (n) discrete contact points K, the contact points being points along the path of the arc at which a first contact block contacts the arc as the effective radius of the first pulley is varied,
      ii. Drawing the normal to the tangent of the first arc at a selected contact point $K_A$ along the arc path, iii. forming a first circle which encompasses the arc of the crown of the first contact block in contact at contact point $K_A$ with the first inner face of the first variable pulley and locating the center of the first circle along the established normal, thus defining the radius of the first circle, iv. drawing the first pitch-line to determine the magnitude of the vertical component of the center of the first circle relative to the pitch-line and measuring the effective radius of the first variable pulley which is the vertical component of the pitch-line relative to the axis of the first pulley, v. locating the horizontal midpoint of the first block along the pitch-line and measuring the horizontal component of the center of the first circle relative to the midpoint, vi. calculating the slope of the chain-belt contact blocks relative to the plane of the axes of the first and second shafts, vii. calculating the second variable pulley effective radius from the slope, and drawing the second pitch-line corresponding to the second variable pulley, viii. locating the midpoint of the second contact block on the second pitch-line by drawing a line perpendicular to the first pitch-line from the midpoint of the first contact block to the second pitch-line, ix. locating the center of a second circle by utilizing the midpoint of the second block and constructing therefrom duplicates of the vertical and horizontal components of the center of the first circle relative to the midpoint of the first contact block, x. drawing a second crown arc from the center of the second circle with a radius equal to the radius of the first circle, and xi. repeating this procedure for the remaining contact points (n) such that an envelope of the second arcs is created to describe the contact surface of the second contact block so as to define the profile of the inner fact of the second pulley sheave which is the conjugate of the inner face of the first pulley sheave so that the center line of the chain remains substantially perpendicular to the axis of the first and second shafts when the pulleys are varied.

3. The method for constructing the sheave profile according to claim 2 wherein the profile of the second inner face is congruent with the profile of the first inner face and is further determined and constructed according to the following steps:

a. drawing conventional x and y axes and calculating the effective radius of both the first and the second pulleys where the radii are equal;

b. locating the midpoint of the first contact block and there defining x as zero and y as the effective radii of the first and second variable pulleys;

c. locating the center of a third circle relative to the midpoint using the dimensions for the vertical and horizontal components of the center of the first circle determined above;

d. from the center of the third circle, drawing the third circle with the radius equal to the radius of the first circle and defining the intersection of the first circle with the inner face of the first variable pulley as point $K_{A0}$;

e. choosing an arc defining the portion of the inner face of the first variable pulley from the point $K_{A0}$ to an extreme end of the inner face of the first pulley;

f. constructing the conjugate of the chose arc defining portion; and g. superimposing the conjugate as the remaining portion of the inner face of the first pulley extending from point $K_{A0}$ in the opposite direction of the chosen arc defining portion by rotating the conjugate 180 degrees about the origin 0 in the x-y plane.

4. A method for constructing the sheave profile for a continuously variable pulley transmission comprising:

a. providing a variable first pulley operatively disposed on a first shaft;

b. providing a variable second pulley operatively disposed on a second shaft parallel to the first shaft;

c. providing a chain belt to interconnect the first and second variable pulleys, the chain belt having a plurality of crown faced contact blocks that are flexibly interconnected to define articulation points therebetween;

d. providing a drive ratio control means to control the effective radii of the first and second pulleys, wherein each of the first and second variable pulleys have sheaves including an inner face profile, the inner face profile of the first pulley being given and the inner face profile of the second pulley being determined and constructed according to the following steps:

i. drawing the given first arc defining the first inner face of the first variable pulley and dividing the first arc into (n) discrete contact points $K_A$, the contact points being points along the path of the arc at which a first contact block contacts the arc as the effective radius of the first pulley is varied, ii. determining the radius of a first circle which encompasses the arc of the crown of the first contact block, iii. drawing a first series of circular arcs with the discrete contact points $K_A$'s as their centers, the arcs having radii equal to the radius of the first circle, iv. tracing the envelope of the first series of arcs;

v. calculating the effective radii of the first and the second variable pulleys while assuming the slope of the chain-belt contact blocks relative to the plane of the axes of the first and second shafts to be zero, vi. locating the joint $J_A$ on the envelope having a vertical component equal to the sum of the effective radius of the first pulley and the vertical component of the center of the first circle relative to the pitch line of the first contact block, vii. locating the block midpoint using the vertical and horizontal components of the center of the first circle while assuming point $J_A$ to be the center of a circle which encompasses the arc of the crown of the first contact block, viii. locating the midpoint of a second contact block having a horizontal component equal to the midpoint of the first contact block, and a vertical component equal to the negative of the radius of the second variable pulley, ix. locating the center of a second circle by utilizing the midpoint of the second block and constructing therefrom duplicates of the vertical and horizontal components of the center of the center first circle, x. drawing a second crown arc from the center of the second circle with a radius equal to the radius of the first circle, xi. repeating this procedure for positive and negative increments of the slope until the minimum and maximum radius of the first pulley are reached, thereby forming a second series of circular arcs, and xii. tracing the envelope of the second series of arcs to form the second inner face of the second variable pulley that is the conjugate profile of the first inner face of the first variable pulley.

5. A drive mechanism for use in a continuously variable pulley drive ratio transmission, comprising:

a. a variable primary pulley operatively disposed on a first shaft and having an inner face;

b. a variable secondary pulley operatively disposed on a second shaft parallel to the first shaft and having an inner face wherein each of the inner faces of the primary and secondary variable pulleys have a profile curve constructed according to the following steps:

i. providing a first arc defining an inner face profile of the primary variable pulley, ii. determining the relationship between the axial displacement and the radial displacement of one of the contact blocks corresponding to movement of the contact block resulting from a change in the effective radius of the primary variable pulley, iii. determining the locus of points through which a contact point of the contact block moves as the effective radius of the primary pulley is changed and the contact block changes in the radial position and follows the first inner face, iv. superimposing the determined axial displacement for the locus of points to provide a second locus of points, and v. providing a series of second arcs with each defined by one of the second locus of points, and providing an envelope of the series of arcs thereby defining a second inner face profile of the secondary variable pulley;

c. a chain belt to interconnect the primary and secondary variable pulleys, the chain belt having a centerline perpendicular to the input and output shafts, the chain belt further having a plurality of crown faced contact blocks that are flexibly interconnected to define articulation points therebetween, the articulation points along the primary and secondary pulleys defining pitchlines, the primary pulley having an effective radius defined by the radial distance between the axis of the first shaft and the articulation points along the primary pulley, and the secondary pulley having an effective radius defined by the radial distance between the axis of the second shaft and the articulation points along the secondary pulley; and d. a drive ratio control means to control the effective radii of the primary and secondary pulleys between various positions, such that for each effective radius of the primary pulley there is a corresponding effective radius of the secondary pulley, a first contact point wherein the first contact block contacts the inner face of the primary pulley and moves between various positions on the inner face to trace a first locus of contact points in response to a change in the effective radius of the primary pulley, and a second contact point that traces a second locus of contact points on the inner face of the secondary pulley with the second locus of contact points conforming to the first locus of contact points, whereby the centerline of the chain belt remains in a plane substantially perpendicular to the first and second shafts during movement of the primary and the secondary pulleys between all of the various positions.

6. The drive mechanism of claim 5 wherein:

the variable primary pulley further includes a first sheave axially fixed relative to the input shaft and a second sheave axially translatable relative to the input shaft, the first and second sheaves having inner faces;

the variable secondary pulley further includes a third sheave axially fixed relative to the output shaft and a fourth sheave axially translatable relative to the output shaft, the third and fourth sheaves having inner faces;

the drive ratio control means includes a first control means that controls the effective radius of the primary pulley by moving the second sheave between several positions and a second control means that controls the effective radius of the secondary pulley by moving the fourth sheave between several positions; and, the chain belt has a fixed length and transmits torque from the input to the output shaft.

7. The drive mechanism of claim 6 wherein:

the blocks engage the first and second sheaves at a first pair of contact points at a first variable distance from the axis of the input shaft and the blocks engage the third and fourth sheaves at a second pair of contact points at a second variable distance from the axis of the output shaft, the first variable distance corresponds to an effective radius of the primary pulley and the second variable distance corresponds to an effective radius of the secondary pulley; and the first pair of contact points moves between a first and a second position on the inner faces of the first and second sheaves to trace a first locus of contact points in response to a change in the effective radius of the primary pulley; and the second pair of contact points traces a second locus of contact points on a inner face conformed to the locus traced by the first pair of contact points.

8. The drive mechanism of claim 7 wherein the centerline of the chain belt is displaced along the axis of the input shaft and the output shaft an equal distance in the same direction relative to a change equally in the axial location of the second sheave and the fourth sheave, regardless of the initial and final positions of the second and fourth sheaves.

9. The drive mechanism of claim 8 wherein the inner face of the primary pulley and the inner face of the secondary pulley have curved profiles.

* * * * *

UNITED STATES PATENT AND TRADEMARK OFFICE
CERTIFICATE OF CORRECTION

PATENT NO. : 5,328,412
DATED : July 12, 1994
INVENTOR(S) : Metin M. Durum

It is certified that error appears in the above-indentified patent and that said Letters Patent is hereby corrected as shown below:

<u>On the Title Page</u> after "Attorney, Agent, or Firm", delete
"Willian Brinks Olds" and substitute --Willian Brinks Hofer Gilson & Lione--.

Col. 9, line 43, delete "fact" and substitute --face--.

Col. 10, line 5, delete "chose" and substitute --chosen--.

Col. 10, claim 4, line 51, delete "joint" and substitute --point--.

Signed and Sealed this

Tenth Day of October, 1995

*Attest:*

BRUCE LEHMAN

*Attesting Officer*     *Commissioner of Patents and Trademarks*